US010070109B2

(12) United States Patent
Lim et al.

(10) Patent No.: US 10,070,109 B2
(45) Date of Patent: Sep. 4, 2018

(54) HIGHLIGHT RECOVERY IN IMAGES

(71) Applicant: Apple Inc., Cupertino, CA (US)

(72) Inventors: Suk Hwan Lim, Mountain View, CA (US); Frederic Cao, Santa Clara, CA (US); Touraj Tajbakhsh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 15/198,354

(22) Filed: Jun. 30, 2016

(65) Prior Publication Data

US 2018/0007332 A1    Jan. 4, 2018

(51) Int. Cl.
*G06T 5/00* (2006.01)
*H04N 9/64* (2006.01)
*H04N 5/235* (2006.01)
*H04N 9/68* (2006.01)
*H04N 9/04* (2006.01)

(52) U.S. Cl.
CPC ............ *H04N 9/643* (2013.01); *G06T 5/008* (2013.01); *H04N 5/2355* (2013.01); *H04N 9/68* (2013.01); *G06T 2207/10024* (2013.01); *H04N 9/045* (2013.01)

(58) Field of Classification Search
None
See application file for complete search history.

(56) References Cited

U.S. PATENT DOCUMENTS

| 6,757,428 | B1 * | 6/2004 | Lin | ...................... G06K 9/3241 |
| | | | | 382/162 |
| 8,164,594 | B2 * | 4/2012 | Watanabe | ............... G06T 15/60 |
| | | | | 345/426 |
| 8,441,498 | B2 * | 5/2013 | Lammers | ................. G09G 5/02 |
| | | | | 345/589 |
| 8,537,177 | B2 * | 9/2013 | Bhaskaran | ........... H04N 1/6027 |
| | | | | 345/549 |
| 2003/0043391 | A1 * | 3/2003 | Childs | ................. H04N 1/6022 |
| | | | | 358/1.9 |

(Continued)

FOREIGN PATENT DOCUMENTS

WO    WO 2011067755 A1 *    6/2011    ........... H04N 1/6027

OTHER PUBLICATIONS

Gradient domain color restoration of clipped highlights. Rouf et al. 2012.*

(Continued)

*Primary Examiner* — Delomia L Gilliard
(74) *Attorney, Agent, or Firm* — Fenwick & West LLP

(57) ABSTRACT

Embodiments of the present disclosure relate to highlight recovery of a high-resolution image using a single low-resolution image captured at a lower exposure. An example apparatus includes a hue target circuit that receives an input image at a high-resolution including at least one pixel with a clipped color channel. For example, the input image is a Blue sky image with a pixel having clipped Blue channel. The hue target circuit also receives a set of candidate hue maps having a pixel resolution lower than the high-resolution of the input image. The hue target circuit generates a target hue value for the at least one pixel using the pixel information of the set of candidate hue maps. The apparatus also includes a hue recovery circuit that generates a recovered version of the input image by adjusting hue information of the clipped color channel based on the generated target hue.

20 Claims, 7 Drawing Sheets

(56) References Cited

U.S. PATENT DOCUMENTS

| | | | | |
|---|---|---|---|---|
| 2003/0222991 A1* | 12/2003 | Muammar | ............... | G06T 5/40 |
| | | | | 348/222.1 |
| 2004/0109072 A1* | 6/2004 | Gallagher | ............... | H04N 9/646 |
| | | | | 348/246 |
| 2007/0076277 A1* | 4/2007 | Miyawaki | ............... | G06T 7/90 |
| | | | | 358/520 |
| 2008/0117318 A1* | 5/2008 | Aoki | ............... | H04N 5/367 |
| | | | | 348/246 |
| 2008/0285884 A1* | 11/2008 | Nishijima | ............ | H04N 1/6027 |
| | | | | 382/274 |
| 2011/0280494 A1* | 11/2011 | Da Rocha Leitao | ... | G06T 5/002 |
| | | | | 382/274 |
| 2012/0002082 A1* | 1/2012 | Johnson | ............... | G06T 5/50 |
| | | | | 348/234 |
| 2012/0201450 A1* | 8/2012 | Bryant | ............... | H04N 1/60 |
| | | | | 382/162 |
| 2013/0321679 A1* | 12/2013 | Lim | ............... | H04N 5/23229 |
| | | | | 348/256 |
| 2015/0015740 A1* | 1/2015 | Cho | ............... | H04N 5/2351 |
| | | | | 348/234 |
| 2015/0049939 A1* | 2/2015 | Siddiqui | ........... | H04N 1/40012 |
| | | | | 382/163 |
| 2017/0070689 A1* | 3/2017 | Silverstein | ......... | H04N 5/3572 |

* cited by examiner

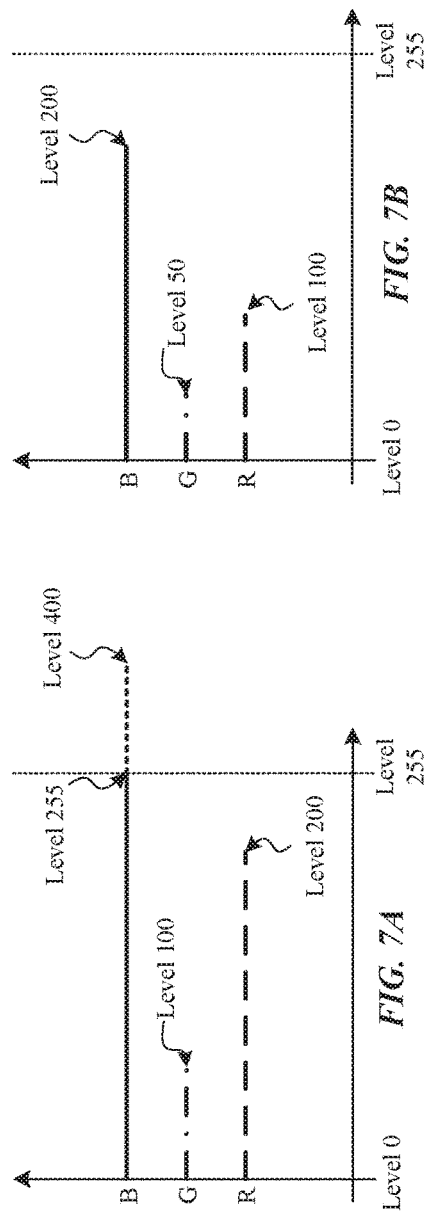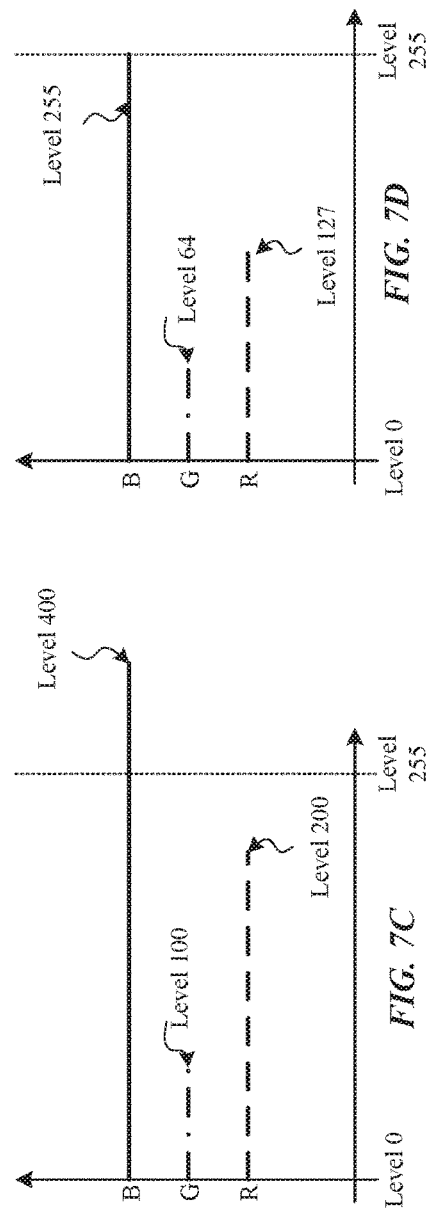

HIGHLIGHT RECOVERY IN IMAGES

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipeline is often implemented as a hardware component separate from the CPU and dedicated to perform one or more image processing algorithms.

The image sensor used for capturing images has a finite dynamic range such that when an image is overexposed, some color channels corresponding to highlights may be clipped. For example, an image may include some areas where the Green, Red and/or Blue color channel is clipped. The clipping causes the clipped areas of the image to have an inaccurate hue.

SUMMARY

Embodiments of the present disclosure relate to an apparatus and a method for highlight recovery of images and more specifically to highlight recovery of a high-resolution image using a single low-resolution image captured at a lower exposure.

In one embodiment, an apparatus for performing highlight recovery includes a hue target circuit that receives an input image at a high-resolution including at least one pixel with a clipped color channel. For example, the input image is an image of a Blue sky with one or more pixels having clipped Blue channels. The hue target circuit also receives a set of candidate hue maps having a pixel resolution lower than that of the high-resolution of the input image. The hue target circuit generates a target hue value for the at least one pixel using the pixel information of the set of candidate hue maps. The apparatus also includes a hue recovery circuit that generates a recovered version of the input image by adjusting hue information of the clipped color channel based on the generated target hue.

In one embodiment, the set of candidate hue maps is generated from a thumbnail image that was captured by the same image sensor as that of the input image immediately after capturing the input image. The pixel resolution of the thumbnail is much lower than the high-resolution and is equal to that of the set of candidate hue maps.

In one embodiment, the thumbnail is captured by the image sensor at an exposure level that is much lower than an exposure level of the input image.

In one embodiment, none of the pixel channel hues of the thumbnail are clipped.

In one embodiment, the hue target circuit includes an upsampler circuit for upsampling the set of candidate hue maps into a set of upsampled candidate hue maps at the high-resolution of the input image, and the hue target circuit generates the target hue based on the upsampled candidate hue maps.

In one embodiment, the hue target circuit determines a weight for each upsampled candidate hue map based on how close the candidate hue value is relative to the clipped channel hue of the pixel, and the hue target circuit generates the target hue by aggregating weighted candidate hue values.

In one embodiment, the hue target circuit generates a conservative hue value for the pixel based on hue information of the received input image.

In one embodiment, the hue target circuit generates the target hue value by mixing the conservative hue value with the aggregated weighted candidate hue values.

In one embodiment, the hue recovery circuit generates the recovered version of the input image by determining possible recovered values for the pixel using ratio of color channel hue values of the target hues, and the hue recovery circuit adjusts the hue information using the determined possible recovered values for the pixel.

In one embodiment, the hue recovery circuit generates the recovered version of the input image by blending the possible recovered values with hue value of the pixel of the received first image based on how close the hue value of the pixel is relative to a maximum hue value of an image sensor capturing the first image, and the hue recovery circuit adjusts the hue information using the blended hue values.

In one embodiment, the hue recovery circuit generates the recovered version of the input image by performing soft clipping on blended hue values by translating hue values to within a dynamic range of the image sensor, and the hue recovery circuit adjusts the hue information using the soft clipped value.

In one embodiment, the hue recovery circuit generates the recovered version of the input image by performing hue preservation on translated hue values during the soft clipping by recovering the hue values that are altered during the soft clipping, and the hue recovery circuit adjusts the hue information using the hue preserved pixel value.

Embodiments also relate to a non-transitory computer-readable medium storing a digital representation of an example apparatus for highlight recovery of images and more specifically for highlight recovery of a high-resolution image using a single low-resolution image captured at a lower exposure.

BRIEF DESCRIPTION OF THE DRAWINGS

FIGS. 7A-7D illustrate color channel hue values of an example pixel being recovered using highlight recovery described in this disclosure, according to one embodiment.

Figure 1:
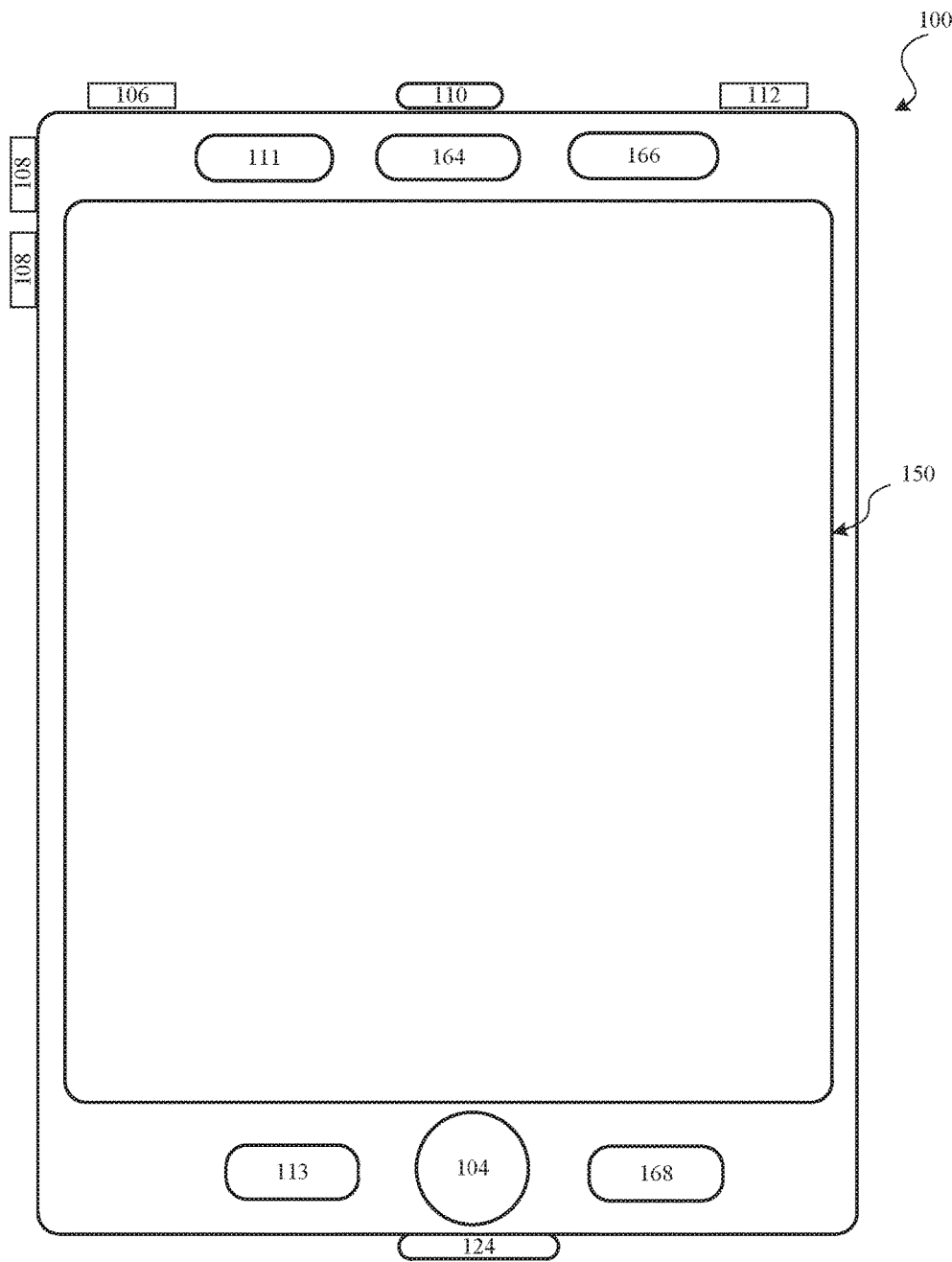
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

An embodiment of the present disclosure relates to highlight recovery of overexposed portions of a high-resolution image using a low-resolution image (e.g., thumbnail). The thumbnail is captured immediately after capturing the high-resolution image at a lower exposure than that of the high-resolution image to reduce the probability of clipping pixel color channels. A set of low-resolution candidate hue maps generated from the thumbnail are upsampled to convert to the same resolution as that of the high-resolution image. A target hue value for each pixel color channel of the high-resolution image is calculated from the set of candidate hue maps. A recovered version of a pixel color channel is generated using a ratio of the target hue values of the pixel color channels. Soft clipping and hue preservation may be performed on the recovered pixel color channel to complete the recovery process for pixel color channel. The recovery process may be repeated for other all color channels of all pixels of the high-resolution image irrespective of whether those pixels have a clipped color channel or not. As a result, a high-resolution image with clipped portions can be transformed into a hue corrected version of the same image, thereby solving the technical problem of hue correction during image processing.

The term "hue" described herein refers to a representation of color of an image. For example, the hue of a pixel can be represented by a mix of Red, Green, and Blue channels. The terms "hue" and "color" are used interchangeably throughout this disclosure.

Color digital images are made of pixels, and pixels are made of combinations of primary colors represented by a series of code. An example RGB image has three channels: Red, Green, and Blue. The term "channel" described herein refers to one of the Red channel, the Green channel, or the Blue channel, of an image using the RGB color model.

The term "full-resolution" of an image described herein refers to the highest resolution of the image sensor used for capturing the image. The term "high-resolution" described herein refers to a resolution that is closer to the full-resolution that to a resolution of a low-resolution of the thumbnail as defined below.

The term "low-resolution" of an image described herein refers to a resolution that is much lower than the full-resolution. For example, if the full-resolution is 1920×1280 pixels, low-resolution may be 400×300 pixels or lower. The terms "low-resolution" and "thumbnail" are used interchangeably throughout this disclosure.

The image pixels as described herein have a default 8-bit range for hue values, for example from level 0 and level 255, unless otherwise specified.

The term "clipping" described herein refers to a color intensity of an area of the image (e.g., a pixel) that is higher than the maximum color intensity of the image sensor used to capture the image. For example, if the upper limit of the image sensor's hue dynamic range is represented by level 255, a pixel channel is deemed to be clipped when the actual color intensity of the pixel channel is higher than level 255 (e.g., level 400) even though the image sensor only registers a level 255 due to its finite dynamic range. The terms "clipping" and "saturation" are used interchangeably throughout this disclosure.

Highlight recovery using a thumbnail image has several advantages. First, if only one additional image is captured instead of capturing multiple additional images, the processing overhead is reduced. The processing overhead is reduced even further as the one additional image is a thumbnail as opposed to a high-resolution image. Moreover, the disclosed technique can be applied to video as the risk of the object moving between the capture of the high-resolution image and the thumbnail is typically low.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
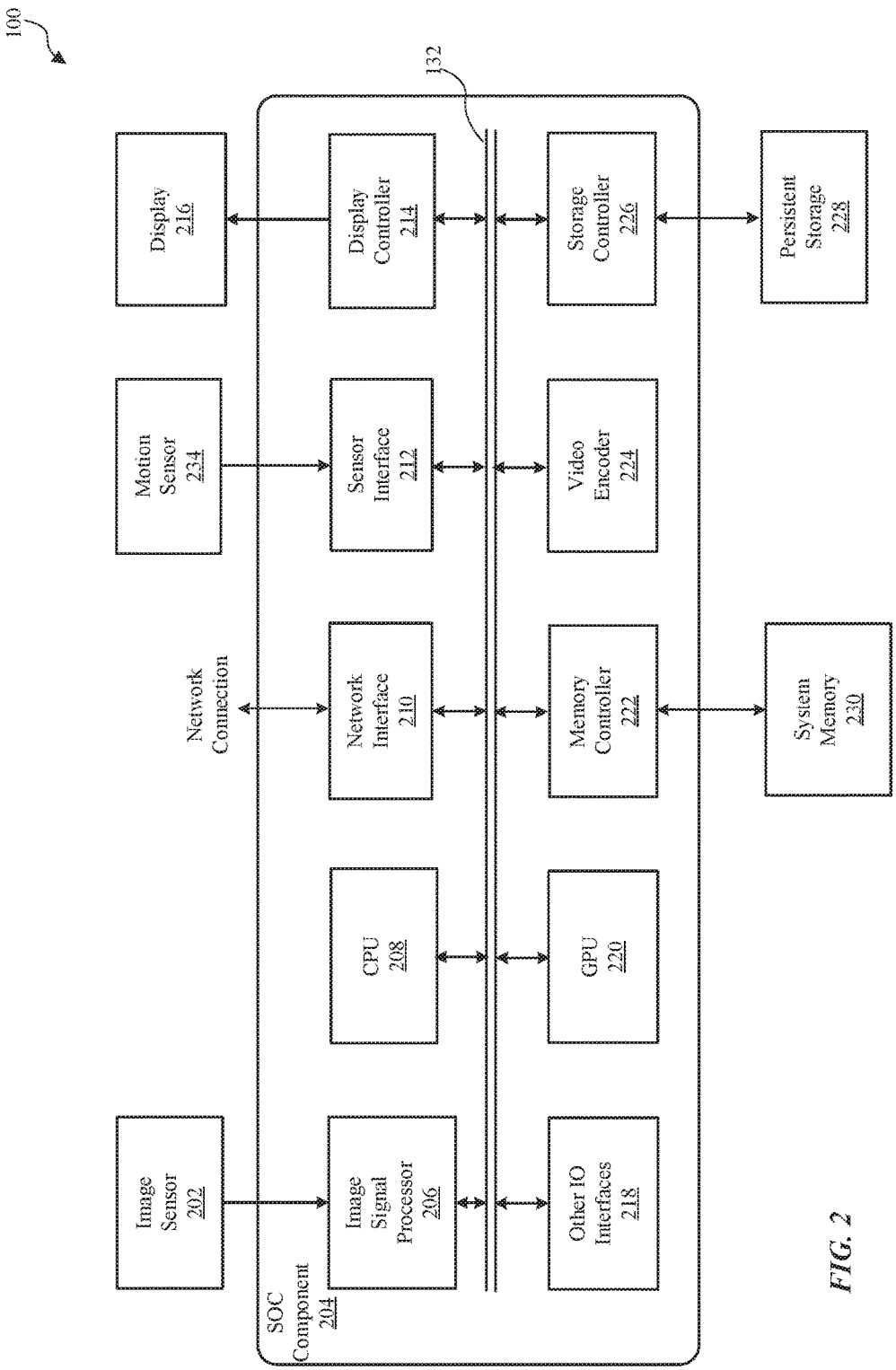
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 106 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipeline

Figure 3:
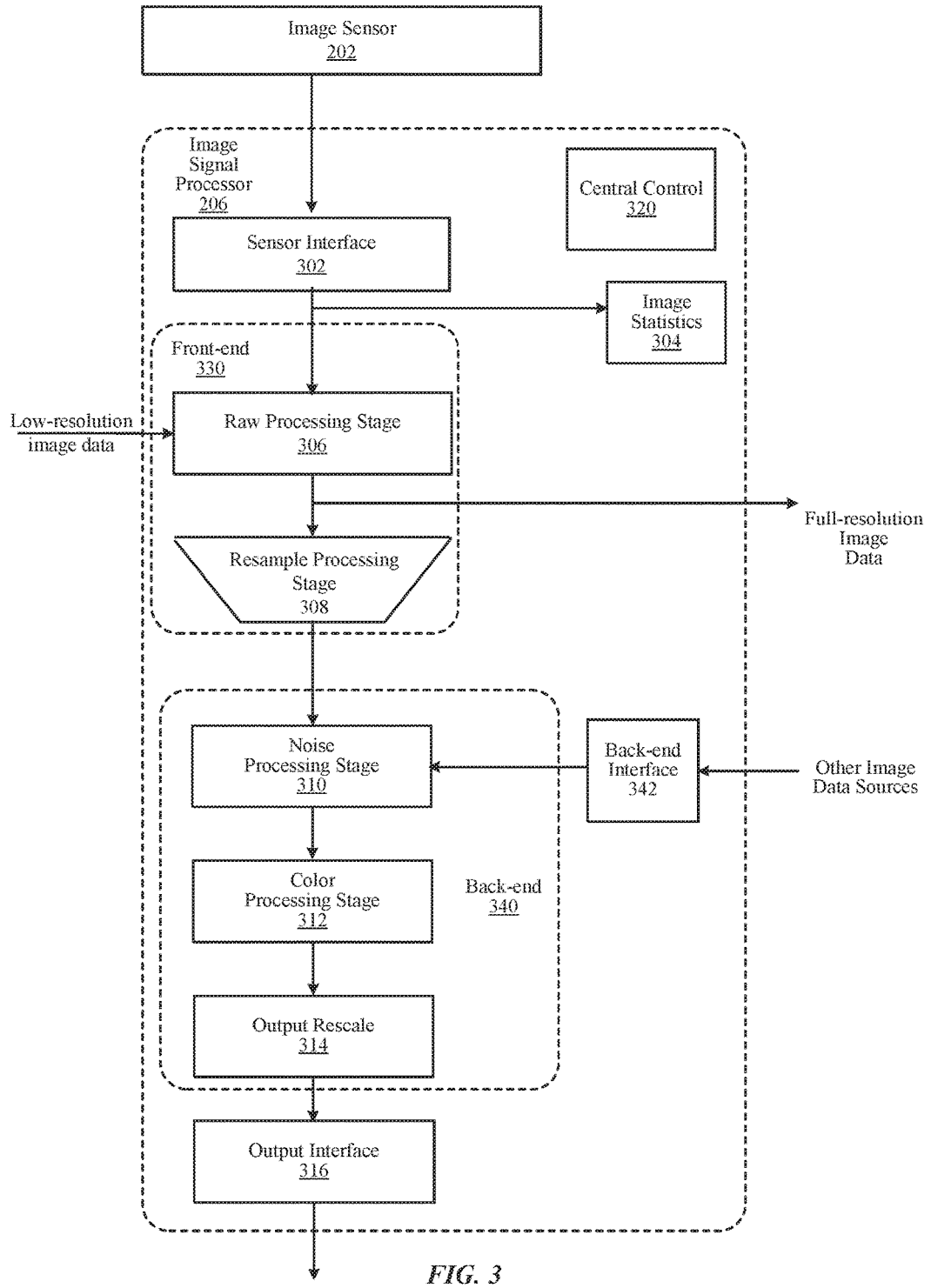
FIG. 3 is a block diagram illustrating image processing pipeline implemented using an image signal processor, according to one embodiment.

FIG. 3 is a block diagram illustrating image processing pipeline implemented using ISP 206, according to one embodiment. In the embodiment of FIG. 3, ISP 106 is coupled to image sensor 102 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format or RGB format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. The clipped (or nearly clipped) pixel values are estimated using low-resolution image data (e.g., low-resolution candidate hue maps generated from a thumbnail) as described below with reference to FIGS. 5 and 6. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color channel output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Figure 4:
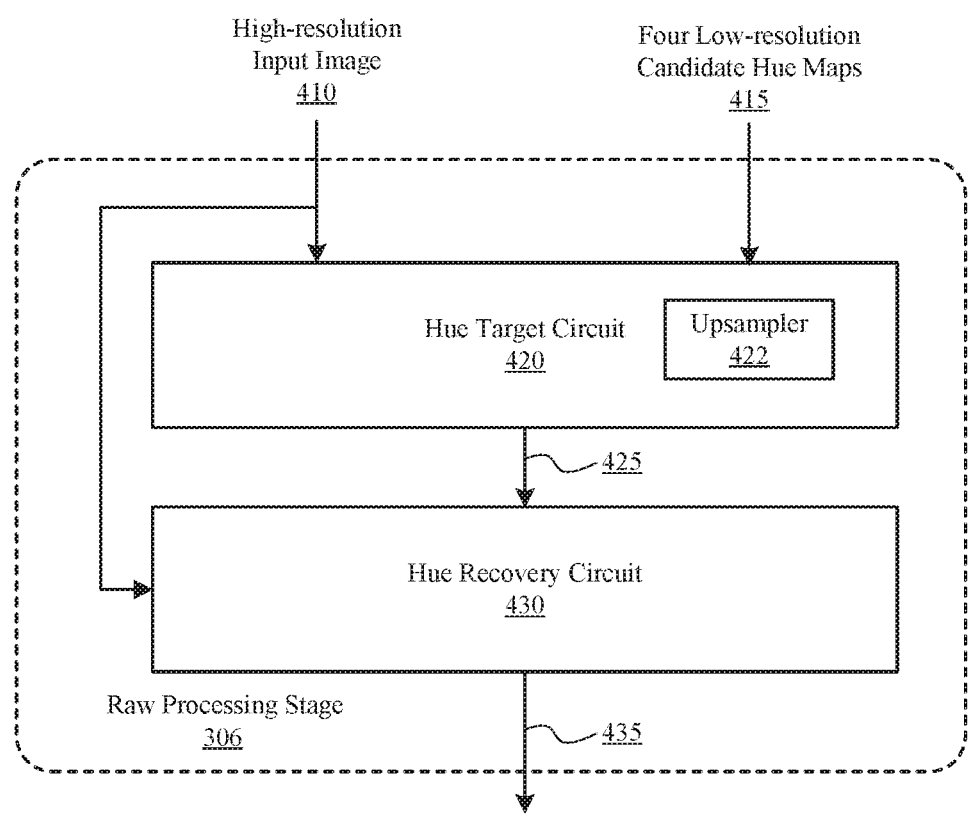
FIG. 4 is a block diagram illustrating a raw processing stage of the image processing pipeline of FIG. 3, according to one embodiment.

FIG. 4 is a block diagram illustrating the raw processing stage 306 of the image processing pipeline of FIG. 3 for highlight recovery, according to one embodiment. The raw processing stage 306 recovers the clipped color channel(s) of a pixel by first determining target hue values for each color channel of the pixel and then determining recovered hue values for each color channel. The raw processing stage 306 includes a hue target circuit 420 for determining the target hue values and hue recovery circuit 430 for determining recovered hue values from the target hue values and the high-resolution input image. Hue target circuit 420 and hue recovery circuit 430 may include various logic gates, registers and other circuits to implement their respective functions. In one embodiment, the functionality of the hue target circuit 420 and hue recovery circuit 430 may be implemented in hardware, firmware, software, or some combination thereof.

The hue target circuit 420 receives an input image 410 at high-resolution (hereinafter "input image") that may include one or more pixels with clipped color channels. In some embodiments, the high-resolution of the input image 410 may be close to or equal to the full-resolution of the image sensor 202. In one embodiment, the input image is received from the image sensor 202 via the sensor interface 302. Alternatively, the input image is received from a memory (e.g., from persistent storage 228 or system memory 230) that stores the image data captured by the image sensor 202. Some of the pixels may include more than one clipped color channel. If a pixel includes two clipped color channels, it is still possible to recover the two clipped color channels based on the information of the unclipped third color channel. However, if all three color channels of pixel are clipped, it may not be possible to recover any of the three clipped color channels.

The hue target circuit 420 also receives a set of candidate hue maps 415 (e.g., four candidate hue maps) from outside of the ISP 206 (e.g., from persistent storage 228 or system memory 230). Each candidate hue map includes a candidate hue value for each color channel of each pixel of the hue map. The set of candidate hue maps are generated from a low-resolution image (or thumbnail) captured by the image sensor 202. The image sensor 202 captures the thumbnail at almost the same time as that of capturing the input image such that the thumbnail and input image capture substantially the same scene. The thumbnail is captured at an exposure that is lower than that of the input image to reduce the possibility of clipping of the pixel color channels. For example, the thumbnail may be captured at an exposure value that is 8 times lower than that of the input image. By capturing the thumbnail at a lower exposure value, the thumbnail likely avoids clipping color channels of its pixels. In one embodiment, none of the pixel color channels of the thumbnail are clipped such that every pixel color channel has an actual hue value that falls within the dynamic range of the image sensor 202.

The received candidate hue maps correspond to the same scene as the input image, but are at a resolution that is much lower than that of the high-resolution of the input image. For example, if an input image includes 1920×1080 pixels, its corresponding thumbnail may include 100×100 pixels and the corresponding candidate hue maps include 100×100 pixels. In this example, each candidate hue map includes a candidate hue value for each color channel of the 100×100 pixels. While example embodiments of this disclosure use four thumbnails for recovering clipped color channels, it is understood that the set of thumbnails may include fewer than or more than four thumbnails.

The hue target circuit 420 uses an upsampler circuit 422 to generate upsampled candidate hue maps for each of the received set of candidate hue maps. The upsampled candidate hue maps are at the same resolution as that of the input image. In the above example when input image includes 1920×1080 pixels and each of the received candidate hue map includes 100×100 pixels, each of the upsampled candidate hue maps include 1920×1080 pixels. In this example, each upsampled candidate hue map includes a candidate hue value for each color channel of the 1920×1080 pixels. The hue target circuit 420 then determines a target hue 425 for each color channel of each pixel of the input image by processing both the actual hue from the input image and the candidate hue values from each of the set of upsampled candidate hue maps. The process of determining target hues for pixel color channels is described below in detail with reference to FIG. 5.

The hue recovery circuit 430 receives the high-resolution input image and receives target hue values for each color channel of a pixel. The hue recovery circuit 430 uses this information to recover hue information in the high-resolution input image, and generates a recovered image 435 with corrected hue information. Specifically, the hue recovery circuit 430 generates a recovered hue value for each color channel of the pixel. For each color channel, the hue recovery circuit 430 determines two possible recovered hue values and mixes between them to smooth transitions. The hue recovery circuit 430 then blends the recovered hue value with that of an observed hue value of the pixel channel based on how close the observed hue value is from clipping for the given color channel. The observed hue value of a pixel as described herein is the hue value of the full resolution input image. For example, if the observed hue value is far from the clipping value (e.g., level 50 on a scale of 0-255), the hue recovery circuit 430 selects the observed hue value and if the observed hue value is close to clipping (e.g., level 225 on the scale of 0-255) or actually clipped (e.g., level 255 on the scale of 0-255), the recovered hue value is selected. The hue recovery circuit 430 may also perform soft clipping to ensure that the recovered values stay with the maximum hue values for each color channel (e.g., within level 255 on a scale ranging from level 0 to 255). The hue recovery circuit 430 may also perform hue preservation to preserve any hue values that might have altered during soft clipping. The process of generating recovered hue values is further described below in detail with reference to FIG. 6.

Figure 5:
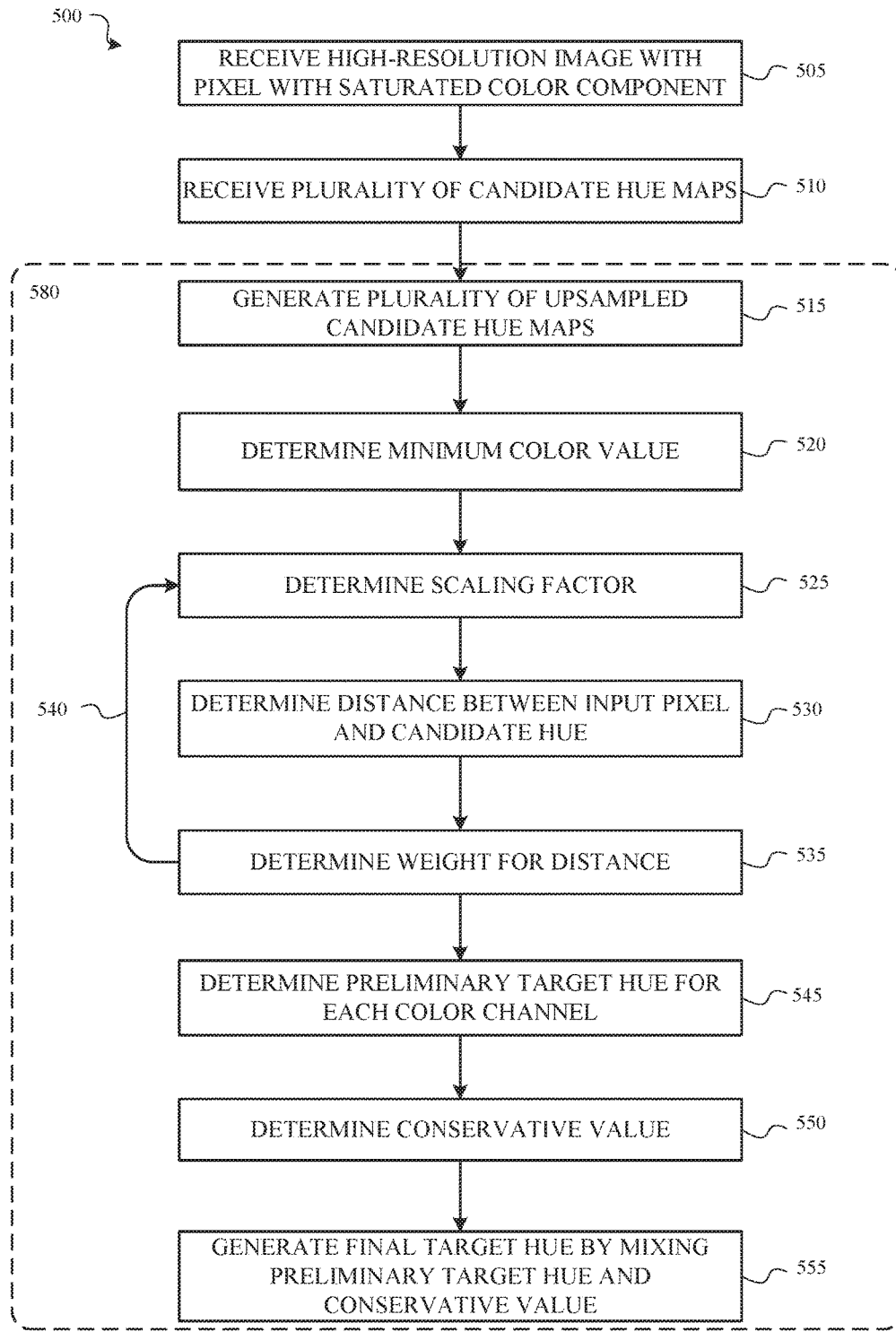
FIG. 5 is a flowchart illustrating a method of determining target hue values for recovering color channels of a clipped pixel, according to one embodiment.

FIG. 5 is a flowchart illustrating a method 500 of determining target hue values for recovering color channels of a clipped pixel, according to one embodiment. The steps of the method 500 are performed by hue target circuit 420. In some embodiments, each step of the method 600 may be performed by a separate circuit or module within the hue target circuit 420. The example method 500 describes steps for determining target hue values for recovering a clipped Blue channel hue value of a pixel (hereinafter referred to as "current pixel") of an input image (e.g., a Blue sky image). The steps of method 500 are equally applicable to determining target hue values for recovering other channels of the current pixel (i.e., Green and Red channels).

The hue target circuit 420 receives 505 a high-resolution input image that includes one or more pixels with clipped color channels. A demosaicing algorithm has already been applied while generating the input image such that the received input image includes three color channels, Red, Green, and Blue, per pixel.

The hue target circuit 420 receives 510 a set of candidate hue maps from outside of the ISP 206 as described above with reference to FIG. 4. The candidate hue maps have pixel resolutions that are lower than that of the input image. The candidate hue maps may have been generated by software from a low-resolution image (i.e., a thumbnail) captured at an exposure level that is lower than that of the input image. For example, the exposure level of the thumbnail is 8× lower than that of the input image. A lower exposure level of the thumbnail will reduce the probability of clipping the color channels of pixels of the thumbnail such that most, if not all, pixels of the thumbnail do not have clipped color channels.

Due to a lower pixel resolution, the thumbnail may not contain the correct color information for every single pixel. Such lack of correct color information may be even more of a problem in case of edges between flat color areas of the input image, for example, in an area of an image where a blue sky meets a green hill. The color may vary significantly between one side of the edge versus the other and might result in color smearing along the edge. In some cases, the values surrounding a thumbnail pixel might be better hue candidates than the current thumbnail pixel. In one embodiment, the software generates three additional thumbnails to embrace the different colors around each thumbnail pixel resulting in four thumbnails, which are also referred to as candidate hue maps. In one embodiment, three of the four candidate hue maps are generated such that for each thumbnail pixel, the candidate hues include the "reddest," "greenest," and "bluest" in the neighborhood of the current thumbnail pixel. The fourth candidate hue map is the captured thumbnail itself. The method 500 is described for an example embodiment including four candidate hues and it equally applicable to embodiments using fewer or higher number of candidate hues. The candidate hue map generation may be implemented in firmware, hardware, or software.

In step 580, the hue target circuit 420 generates target hue values for pixels of the high-resolution image from the plurality of candidate hue maps and the high resolution image. For each pixel of the high resolution image, a corresponding target hue value is generated. Step 580 includes several sub-steps 515-555 as described below.

The hue target circuit 420 generates 515 a set of upsampled candidate hue maps for each of the set of the candidate hue maps by converting each of the low-resolution candidate hue maps into a high-resolution candidate hue map. For example, the hue target circuit 420 performs a two-dimensional spatial interpolation (e.g., bilinear interpolation) to convert the low-resolution candidate hue maps to high-resolution candidate hue maps. Each of the upsampled candidate hue maps have the same pixel resolution as that of the input image.

When a channel hue of a pixel predominantly represents one color (either primary or secondary color), the ratio between the color channel with minimum input hue value among the channels and the other two channels can be estimated accurately. For example, if a channel hue is predominantly Red, the color channel with minimum input hue value is Blue and an expected ratio between Red/Blue and Green/Blue channels is known. By using such observations for each color, the hue target circuit 420 determines how to weigh each candidate hues and determines the best target hue for each clipped channel of the pixel.

For each color channel of each pixel of the input image, the hue target circuit 420 determines a final target hue value by first determining a preliminary target hue and a conservative hue value, and later mixing the preliminary target hue and the conservative hue value. Here, a preliminary target hue value represents a target hue value generated as an average of the four candidate hue values weighted by their similarity with the current pixel. The conservative hue value is based on the observed clipped hue value of the current pixel and may be used when there is a higher risk that the recovered color value is very different from the actual value of the clipped color channel. An example process of generating the preliminary target hue value, the conservative target hue value, and mixing between the two to generate the final target hue value is described below.

More specifically, the hue target circuit 420 determines 520 a minimum color value between the three color channels of the current pixel of the input image. The minimum color value is determined using the following equation:

$$\text{minP} = \text{minimum}(R\_\text{norm}R, G\_\text{norm}G, B\_\text{norm}B) \quad (1)$$

In the above equation 1, minP is the minimum color value among all three colors channels, R_normR is a normalized value of the observed hue for the Red channel, G_normG is a normalized value of the observed hue for the Green channel, and B_normB is a normalized value of the observed hue for the Blue channel. The observed hue values of the current pixel may be normalized using the expected range of pixel hue values, for example, level 0 to level 255. For a current pixel that includes at least one clipped color channel, one of the observed color values equals the maximum possible value. For example, if the current pixel has hue values of 200, 100, and 255 on the scale of 0 to 255 for the Red, Green, and Blue channels respectively, the minP value for this example pixel would be 100, the value of its Green channel. Here, the Blue channel is likely clipped in an example input image capturing a Blue sky.

For each candidate of the set of upsampled candidate hue maps, the hue target circuit 420 determines a scaling factor, a distance between the current pixel and the candidate, and determines a weight for the distance. The hue target circuit 420 then determines a preliminary target hue value for each color channel based on a combination of the weighted distances of the set of candidate hues as described below.

The hue target circuit 420 determines a scaling factor for the current pixel for normalizing the color channel values based on the determined minimum color channel value. For example, the scaling factor $S_X$ is determined by the following equations:

$$\text{if } (\text{minP} == R\_\text{norm}R), S_X = R/R_{TX} \quad (2.1)$$

$$\text{else if } (\text{minP} == G\_\text{norm}G), S_X = G/G_{TX} \quad (2.2)$$

$$\text{else if } (\text{minP} == B\_\text{norm}B), S_X = B/B_{TX} \quad (2.3)$$

In the above equations 2.1 through 2.3, $S_X$ is the scaling factor for the candidate$_X$; R, G, B represent values for the color channels of the current pixel; and $R_{TX}$, $G_{TX}$, $B_{TX}$ represent values for the color channels corresponding to candidate$_X$.

The hue target circuit 420 determines 530 distance $D_X$ between the current pixel and candidate hues based on the scaling factors. The distance $D_X$ represents how close the hue of the candidate pixel matches the hue of the actual observed pixel. For example, the distance $D_X$ is determined as an aggregate distance for each channel between observed channel values of the current pixel (i.e., R, G, B values) and the scaled candidate hue values using the scaling factor based on the minimum observed channel (i.e., minP). The distance $D_X$ is determined as follows:

$$D_X = \text{abs}(R - \text{min}(\text{ClipLevel\_R}, (S_X * R_{TX})) + \quad (3)$$
$$\text{abs}(G - \text{min}(\text{ClipLevel\_G}, (S_X * G_{TX})) +$$
$$\text{abs}(B - \text{min}(\text{ClipLevel\_B}, (S_X * B_{TX})))$$

In the above equation 3, ClipLevel_R, ClipLevel_G, and ClipLevel_B represent a maximum hue level of Red, Green, and Blue channels respectively. For example, on a hue scale ranging from level 0 to level 255, the maximum level is level 255.

The hue target circuit 420 determines 535 a weight $wT_X$ for the determined distance $D_X$ based on how close the candidate hue value is to the current pixel value. For example, the weight $wT_X$ is determined by:

$$wT_X = \exp(-D_X * \text{CDist}) \quad (4)$$

In the above equation 4, CDist is a constant factor that is programmable by software. The weight $wT_X$ ranges from 0 to 1. The relationship between distance $D_X$ and its weight $wT_X$ is such that the smaller the value of distance $D_X$ the larger its corresponding weight $wT_X$. For example, if the distance $D_X$ value is closer to zero, the corresponding determined $wT_X$ would be closer to 1, and vice versa.

The hue target circuit 420 repeats 540 the steps of determining the scaling factor, the distance between the current pixel and the candidate, and the weight for the distance for each of the four of candidate hue maps. The result is four weight values, one for each candidate hue map.

The hue target circuit 420 determines 545 a preliminary target hue value for each color channel of the current pixel by aggregating the determined weighted candidate hue values. For example, the preliminary target hue values are determined with the following equations:

$$R_{PT} = wT_0 * R_{T0} + wT_1 * R_{T1} + wT_2 * R_{T2} + wT_3 * R_{T3} \quad (5.1)$$

$$G_{PT} = wT_0 * G_{T0} + wT_1 * G_{T1} + wT_2 * G_{T2} + wT_3 * G_{T3} \quad (5.2)$$

$$B_{PT} = wT_0 * B_{T0} + wT_1 * B_{T1} + wT_2 * B_{T2} + wT_3 * B_{T3} \quad (5.3)$$

In the above equations 5.1 through 5.3, $R_{PT}$, $G_{PT}$, and $B_{PT}$ represent preliminary target hue values for Red, Green, and Blue channels respectively; $R_{T0}$, $R_{T1}$, $R_{T2}$, and $R_{T3}$ represent candidate Red hue values; $G_{T0}$, $G_{T1}$, $G_{T2}$, and $G_{T3}$ represent candidate Green hue values; $B_{T0}$, $B_{T1}$, $B_{T2}$, and $B_{T3}$ represent candidate Blue hue values; and $wT_0$, $wT_1$, $wT_2$, and $wT_3$ represent candidate weights. Here, each of $R_{TX}$, $G_{TX}$, and $B_{TX}$, represent target hue values from upscaled candidate hue map corresponding to candidate$_X$, and $wT_X$ represents determined weight factor for the corresponding to candidate$_X$.

The hue target circuit 420 determines 550 a conservative value for the color channel of the current pixel that may be used when there is a higher risk that the determined preliminary target hue values of the color channel are very different from the observed hue values of the current pixel within the input image. Example reasons for the preliminary target hue values being different from the observed values may be because 1) the current pixel belongs to a small detail that may be invisible at the lower sampling level of the thumbnail, 2) there may be too many colors in the neighborhood of the current pixel and the four candidate hues might not be enough, or 3) there is a strong motion between the capturing of the thumbnail and the input image. The conservative hue value is based on the observed hue values of the current pixel and is determined without taking highlight recovery into account.

The hue target circuit 420 determines 550 conservative values for the color channels, $R_{CONS}$, $G_{CONS}$, and $B_{CONS}$ as follows:

$$\text{minClip}=\text{minimum}(\text{ClipLevel\_R},\text{ClipLevel\_G},\text{ClipLevel\_B}) \quad (6.1)$$

$$R_{CONS}=\text{minimum}(\text{minClip},R) \quad (6.2)$$

$$G_{CONS}=\text{minimum}(\text{minClip},G) \quad (6.3)$$

$$B_{CONS}=\text{minimum}(\text{minClip},B) \quad (6.4)$$

In the above equations 6.1 through 6.3, ClipLevel_R, ClipLevel_G, and ClipLevel_B represent a maximum hue level of Red, Green, and Blue channels respectively; and R, G, B represent values for the color channels of the current pixel of the input image. The conservative values determined by the above equations are hue values of the current pixel if highlight recovery process is not applied for the current pixel.

The hue target circuit 420 generates 555 final target hue values by combining the determined preliminary target hue values and the determined conservative hue values. The preliminary target hue values and the conservative hue values are mixed to smooth transitions between sharp edges of colors in the input image. An example method of generating final target hue values, $R_T$, $G_T$, and $B_T$ is given by the following equations:

$$R_T=w\text{MixClip}*(R_{CONS}-R_{PT})+R_{PT} \quad (7.1)$$

$$G_T=w\text{MixClip}*(G_{CONS}-G_{PT})+G_{PT} \quad (7.2)$$

$$B_T=w\text{MixClip}*(B_{CONS}-B_{PT})+B_{PT}, \text{ where} \quad (7.3)$$

$$w\text{MixClip}=\text{interpolation}(w\_\text{max},\text{MixClipLUT}), \text{ where} \quad (7.4)$$

$$w\_\text{max}=\text{maximum}(wT_1,wT_2,wT_3,wT_4) \quad (7.5)$$

In the above equations, w_max is a confidence value that is determined as a maximum value of the weight among all four candidates. Interpolation represents an interpolation function (e.g., linear interpolation such as a look-up table), and wMixClip represents an interpolated value corresponding to the determined w_max value from a look-up table MixClipLUT that represents how to mix the determined preliminary target hue values and the conservative hue values. For example, the interpolation may be implemented by the following equations:

$$\text{if } x<t\_\text{min}, w\text{MixClip}(x)=1, \text{ and} \quad (7.6)$$

$$\text{if } x>t\_\text{max}, w\text{MixClip}(x)=0 \quad (7.7)$$

In the above equations, t_min and t_max are two programmable parameters. If wMixClip(x) falls in between t_min and t_max, the interpolation results in an affine transformation between 0 and 1. The generated final target values are used to generate recovered hue values for each color channel of the current pixel as described below with reference to FIG. 6.

Figure 6:
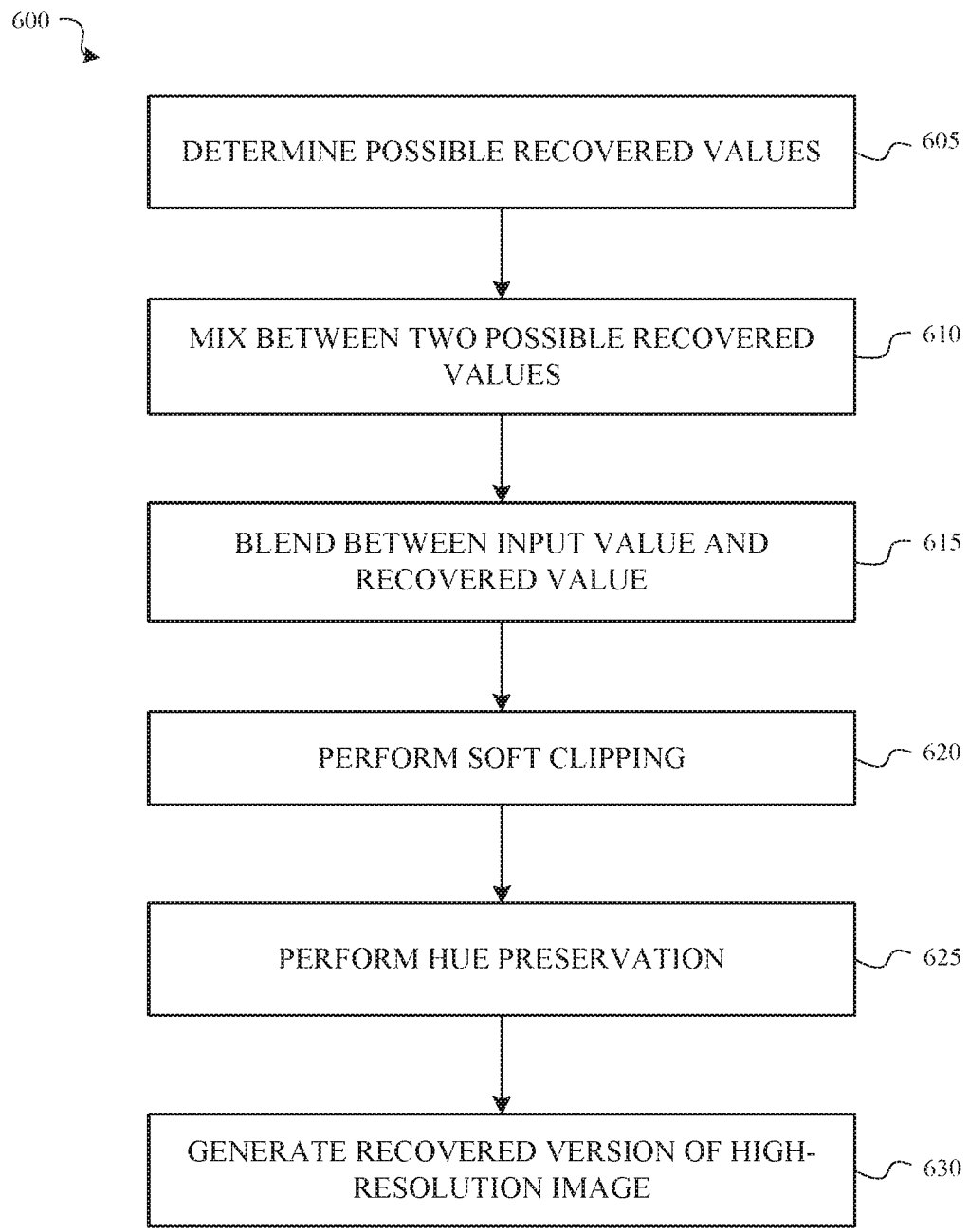
FIG. 6 is a flowchart illustrating a method of determining recovered hue values for color channels of the clipped pixel of FIG. 5, according to one embodiment.

FIG. 6 is a flowchart illustrating a method 600 for determining a recovered hue value of a clipped color channel of the current pixel of FIG. 5, according to one embodiment. The steps of the method 600 are performed by hue recovery circuit 430. In some embodiments, each step of the method 600 may be performed by a separate circuit or module within the hue recovery circuit 430. The example method 600 is described below for recovering a clipped Blue channel hue value of the current pixel. The method 600 is equally applicable to recover the other channels of the current pixel (i.e., Green and Red channels).

The hue recovery circuit 430 receives the final target values generated using the process of FIG. 5 and determines 605 possible recovered hue values for each color channel of the current pixel. To recover the example clipped Blue channel, it is assumed that at least one of the other two channels, Red and Green, are not clipped. If both Red and Green channels are clipped in addition to the clipped Blue channel, it may not be possible to recover any of the clipped channels. If neither of the Red and Green channels is clipped, there are two possible recovered values for the clipped Blue channel. The first possible recovered value is determined based on a ratio of the target hue values between the Blue and Red channels, and the second possible recovered values is determined based on a ratio of the target hue values between the Blue and Green channels. For example, the possible recovered hue values for the clipped Blue channel are given by:

$$B1=h1B*R=B_T/R_T*R \quad (8.1)$$

$$B2=h2B*G=B_T/G_T*G \quad (8.2)$$

In the above equations 8.1 and 8.2, B1 and B2 are possible recovered hue values for the clipped Blue channel; and h1B and h2B represent a ratio between target hue values of the Blue and Red channels, and the Blue and Green channels respectively. On the other hand, if one of the Red and the Green channel is clipped, there would be only one possible recovered value for the clipped Blue channel. In such a scenario, the recovered hue value is determined based on the ratio of the target hue values between the Blue and the unclipped channel, as described by the above equations 8.1 and 8.2.

In embodiments where neither of the Red and Green channels is clipped, the hue recovery circuit 430 mixes 610 between the two possible recovered hue values. Mixing the two possible recovered hue values may be done to smooth the transitions between sharp edges of colors in the input image. Example mixing methods include average of B1 and B2, maximum value of B1 and B2, and a mix ratio depending on a normalized Red value and normalized Green value. Here, the normalized Red and Green values are observed hue values of the current pixel (i.e., raw hue value captured by image sensor and before white balancing). While mixing the two values B1 and B2, each of B1 and B2 is given a weight that is based on how close the Red channel and Green channel respectively is from the maximum possible value. For example, as the value of Red channel (or Green channel) gets closer to the maximum value ClipLevel_R (or ClipLevel_G), the corresponding weight decreases. In an extreme example where the Red channel has reached ClipLevel_R, its weight becomes zero such that only the Green channel value (i.e., B1) is used for recovering the Blue channel.

The hue recovery circuit 430 blends 615 between the pixel value of the high-resolution input image and the recovered pixel value from step 610 in a continuous manner without introducing any discontinuities. In one case where the current pixel value is far from being clipped (e.g., level 50 on a scale of 0 to 255 levels), the blending step 615 results in selecting the observed pixel value (i.e., level 50) and discards the recovered pixel value. In the other case where the observed pixel value is clipped (e.g., level 255 on the scale of 0 to 255 levels), the blending step 615 results in selecting the recovered pixel value and discards the observed pixel value (i.e., level 255).

The transition between selecting the observed pixel value in one extreme case and selecting the recovered value in the other extreme case may be implemented to avoid any discontinuities. For example, a first threshold value of 0.5 on a normalized scale is chosen such that for any current pixel with an observed hue value that is less than the first threshold value, the blending steps results in selecting the observed pixel value. Next, a second threshold value of 0.8 is chosen such that for any observed pixel value greater than the second threshold value, the blending steps results in selecting the recovered pixel value. For the pixels that have an observed pixel value greater than the first threshold value and less than the second threshold value, observed pixel value and the recovered pixel value are blended. The blending may include attaching weights to the observed pixel value and the recovered pixel value, where the weights may depend on how close the observed pixel value is to the first and second threshold values. In one example, the closer the observed pixel value is to a threshold value, the higher its corresponding weight. The recovered value can be higher than that of the maximum pixel value (i.e., ClipLevel_G for Green channel), which is soft clipped to translate the value under the ClipLevel_G as described below.

The hue recovery circuit 430 performs 620 soft clipping to translate the blended pixel values to under the maximum pixel value. The blended pixel values may be higher than the maximum pixel value. For example, the blended pixel value for a clipped Blue channel may correspond to level 400 on a pixel value scale of levels 0 to 255. Soft clipping is performed such that the blended pixel values—after being soft clipped—do not have any discontinuities in the soft clipping curve as well as a derivative of the soft clipping curve because human eyes are sensitive to the derivative of the curve. An example soft clipping curve is a piecewise linear curve. A first portion of the piecewise linear curve includes a first threshold value (e.g., 60% of the maximum pixel value) such that any pixel with a blended value that is less than or equal to the first threshold value is not changed during soft clipping. A second portion of the piecewise linear curve is applicable for pixels with a blended value greater than the first threshold value such that the blended values of those pixels are soft clipped to ensure that those pixel values are bended to be within the maximum pixel value.

An example soft clipping curve may be implemented using the following set of equations:

$$\text{maxLevel}B = \text{maximum}(\text{ClipLevel\_}B, \text{ClipLevel\_}R*h1B, \text{ClipLevel\_}G*h2B) \quad (9.1)$$

$$\text{alpha}B = \text{minimum}(\text{maxClip}, \text{maxLevel}B)*\text{alphaRatio} \quad (9.2)$$

$$\text{beta}B = \text{maxLevel}B/\text{maxClip} \quad (9.3)$$

$$B\text{norm2} = (B\text{blnd} - \text{alpha}B)/(\text{maxLevel}B - \text{alpha}B) \quad (9.4)$$

if(Bblnd>alphaB){

$$\text{softInterp}B = \text{interp2}D((B\text{norm2}, \text{beta}B), DSLUT)$$

$$B_{SC} = \text{alpha}B + (\text{maxClip} - \text{alpha}B)*\text{softInterp}B$$

} else $$B_{SC} = B\text{blnd} \quad (9.5)$$

In the above equations, 9.1 through 9.5, maxLevelB represents the maximum hue value during the blending process, i.e., maximum value among the current pixel hue value of the clipped channel and its corresponding two possible recovered pixel hues. maxClip represents the maximum pixel value after soft clipping is performed such as ClipLevel_B for the Blue channel. alphaB represents a threshold hue value such that any blended value (i.e., Bblnd) that is less than or equal to alphaB is not changed. Here, alphaRatio is programmable and provides a representation of the threshold value. If the blended value is larger than the threshold value, alphaB, soft clipping is performed by an interpolation using the ratios betaB and Bnorm2, and by selecting a curve DSLUT betaB represents a ratio between the maximum hue value during the blending process and the maximum possible pixel value after soft clipping. Bnorm2 represents a ratio between how far the blended value is from the threshold value and how far the maximum hue value during the blending process is from the threshold value. DSLUT represents a curve that hue recovery circuit 430 selects for performing soft clipping and it based on maxLevelB and maxClip values. softInterpB represents a 2D interpolation scheme that results in continuous values both for the interpolated values and their first order derivative. $B_{SC}$ represents the soft clipped value of the Blue channel after bending the blended pixel values to be within ClipLevel_B.

In one embodiment, the translating curve DSLUT is selected separately to perform soft clipping on each individual pixel. Alternatively, a single translating curve DSLUT is selected for performing soft clipping for all pixels of the input image. In such embodiment, the maxLevelB is the maximum hue value during the blending process of all pixels of the input image. For example, if blending of a pixel results in a level 400 and blending of a different pixel results in a level 500, maxLevelB value is level 500 and a DSLUT corresponding to such level is selected for performing soft clipping on all pixels. In some embodiments, soft clipping may alter the hue values of one or more channels of the current pixel. In such embodiment, a hue preservation is performed to recover the altered hue values as described below.

In some embodiments, the hue recovery circuit 430 performs 625 hue preservation to recover any altered hue values during soft clipping. The hue preservation uses cross channel hue ratios instead of channel hue ratios, where cross channel hue ratios are ratios between delta channel hue values while channel hue ratios are ratios between channel hue values themselves. For an example image capturing Blue sky where Blue channel is likely clipped, Blue channel hue value would be the maximum value and Red channel hue value would be the minimum value. Channel hue ratios are given by ratio such as B/G whereas cross channel ratios are ratios between channel hue deltas such as (R−B)/(R−G). Hue preservation may be applied to change only one color channel that might have been altered during the soft clipping step. In the Blue sky image example, the Blue channel hue is determined for preserving cross channel ratios such that:

$$(R_T - B_T)/(R_T - G_T) = (B_{SC} - B_{SC})/(B_{SC} - G_{SC}) \quad (10)$$

In the above equation 10, $R_T$, $G_T$, $B_T$ represent the determined target pixel values and $R_{SC}$, $G_{SC}$, $B_{SC}$ represent channel hue values at the output of soft clipping. The objective is to have the cross channel ratio after the soft clipping to be same as the cross channel ratio based on the final target hue values. The output of the hue preservation step generates a hue preserved version of Blue channel hue represented by $B_{HP}$, which is a modified hue value at the output of the soft clipping, $B_{SC}$.

In some embodiments, hue preservation is implemented for a certain range of the ratio of betaB values, for example, between 1 and 2. The output of the hue preservation step, $B_{HP}$, and the output of the soft clipping step, $B_{SC}$, may be mixed to avoid any discontinuities in the recovered hue values especially in embodiments where hue preservation is implemented for only certain range of betaB values. The mixing step may be performed similar to the mixing step 610 described above with reference to mixing the two possible recovered values. For example, the mixing coefficient may be a function of betaB The output of the mixing step results in a final recovered hue value for the Blue channel of the current pixel.

The hue recovery circuit 430 generates 630 recovered version of the high-resolution image by repeating the example processes described above with reference to FIGS. 5 and 6 (i.e., steps 605 through 625) for every pixel of the high-resolution image irrespective of whether those pixels have a clipped color channel or not.

FIGS. 7A-7D illustrate color channel hue values of an example current pixel to be recovered using highlight recovery process described in this disclosure, according to one embodiment. The hue values of the current pixel shown in FIGS. 7A-7D is a clipped Blue channel of an image such as a Blue sky image. Each of FIGS. 7A-7D show a hue value of a color channel on the X-axis and the color channels themselves on the Y-axis. The range of hue values shown on the X-axis includes from level 0 to level 255, where level 255 represents the maximum hue value the image sensor can capture.

FIG. 7A shows the observed hue values of the current pixel as captured by the image sensor and received as part of the input image to undergo the highlight recovery process described above with reference to FIGS. 5 and 6. The observed hue values of the current pixel include level 255 for the Blue channel, level 100 for the Green channel, and level 200 for the Red channel. While the clipped level of the Blue channel is level 255, the actual hue value of the Blue channel captured by an image sensor with a larger dynamic range is higher than level 255 such as, for example, level 400. The ratio of the observed hue values between the color channels for the received hue values of the current pixel is 1.275 (i.e., 255/200) between Blue and Red, and 2.55 (i.e., 255/100) between Blue and Green.

The hue target circuit 420 receives an input image with the clipped Blue channel along with four low-resolution candidate hue maps. The low-resolution candidate hue maps are upsampled to high-resolution candidate hue maps to match the resolution of the input image. The candidate hues are then processed to generate final target hues, $R_T$, $G_T$, and $B_T$, as described above with reference to FIG. 5. FIG. 7B shows final target hue values for the current pixel including level 200 for the Blue channel, level 50 for the Green channel, and level 100 for the Red channel. The determined final target values represent the actual hue ratios between channels that the image sensor would have captured if the Blue channel were not clipped. The hue ratios for the determined final target values between the color channels are 2 (i.e., 400/200) between Blue and Red, and 4 (i.e., 400/100) between Blue and Green.

The hue recovery circuit 430 determines possible recovered values, mixes the possible recovered values, and blends with the observed values of the current pixel as described above with reference to FIG. 6. The two possible recovered hue values for the Blue channel are given as follows:

$$B1 = h1B*R = B_T/R_T*R = 2*200 = 400 \quad (11.1)$$

$$B2 = h2B*G = B_T/G_T*G = 4*100 = 400 \quad (11.2)$$

As the two possible hue values have the same hue value, there is no need to mix between them. On the other hand, if, for example, $B_T/G_T=4.1$ such that B2=440, the hue recovery circuit 430 mixes between 400 and 440 to generate a recovered hue value for the Blue channel that would be larger than 400 and smaller than 440. As the channel hue being recovered here is the clipped Blue channel hue with an observed hue value that is actually clipped, blending step results in selecting the recovered hue value (i.e., level 400 when $B_T/R_T=2$ and $B_T/G_T=4$) from the mixing step 610. FIG. 7C shows recovered hue values for the current pixel after the blending step but before the soft clipping step. FIG. 7C shows hue values that would have been captured by the image sensor without any color channels being clipped. FIG. 7C shows hue values including level 400 for the Blue channel, level 100 for the Green channel, and level 200 for the Red channel.

The hue recovery circuit 430 performs soft clipping on the blended values to translate the blended values to within the dynamic range of the image sensor. For example, the hue recovery circuit 430 uses a soft clipping curve based on a maximum recovered hue value for all pixels of the input image. If such maximum recovered hue value is level 400, for example, the soft clipping curve will translate the recovered hue value from a range between level 0 and 400 to a range between level 0 and 255. For the example current pixel, the Blue channel hue level is translated from level 400 to level 255 as shown in FIG. 7D. FIG. 7D also shows that the Green channel is translated from level 100 to 64, and the Red channel is translated from level 200 to 127. In another example, if the maximum recovered hue value is level 500 instead, the soft clipping curve will translate the recovered hue value from a range between level 0 and 500 to a range between level 0 and 255. In such example, soft clipping results in hue values of levels 204, 102, and 51 for the Blue, Red, and Green channels respectively. If the soft clipping results in altering any hue values, hue preservation may be performed as described above with reference to step 625 of FIG. 6. The clipped Blue channel is assigned the output of the hue preservation step as the recovered hue value. The process described above for the Blue channel is repeated for the other channels of the current pixel, and then repeated for all pixels of the input image to recover hue values for the entire input image.

In one embodiment, a representation of the image processor or components within the image processor may be stored as data in a non-transitory computer-readable medium (e.g. hard disk drive, flash drive, optical drive). These representations may be, for example, behavioral level, register transfer level, logic component level, transistor level and layout geometry-level descriptions of the image processor.

The disclosure herein has been described in particular detail with respect to a few possible embodiments. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. An apparatus, comprising:
    a hue target circuit configured to:
        receive a first image capturing a scene at a first resolution comprising a pixel with hue information having a clipped color channel;
        receive a plurality of candidate hue maps at a second resolution lower than the first resolution, each of the hue maps representing a different color channel of a second image capturing the scene at the second resolution; and
        generate a target hue by processing the plurality of candidate hue maps, the target hue including information for recovering the clipped color channel of the pixel; and
    a hue recovery circuit configured to generate a recovered version of the first image by adjusting the hue information of the pixel based on the generated target hue.

2. The apparatus of claim 1, wherein the second image is captured at an exposure level lower than an exposure level of the first image.

3. The apparatus of claim 1, wherein hue values of the plurality of candidate hue maps corresponding to color channels of pixels of the second image are not clipped.

4. The apparatus of claim 1, wherein the hue target circuit generates the target hue by:
    upsampling the plurality of candidate hue maps into a plurality of upsampled candidate hue maps at the first resolution, and
    wherein the target hue is generated based on the upsampled candidate hue maps.

5. The apparatus of claim 4, wherein the hue target circuit generates the target hue for the pixel by:
    determining a weight for each upsampled candidate hue map based on how close the candidate hue value is relative to the clipped channel hue of the pixel, and
    wherein the target hue is generated by aggregating weighted candidate hue values.

6. The apparatus of claim 5, wherein the hue target circuit further generates the target hue for the pixel by:
    determining a conservative hue value for the pixel indicated in hue information of the received first image,
    wherein the target hue is generated based on the conservative hue value and the aggregated weighted candidate hue values.

7. The apparatus of claim 6, wherein the hue target circuit generates the target hue value by mixing the conservative hue value with the aggregated weighted candidate hue values.

8. The apparatus of claim 1, wherein the hue recovery circuit generates the recovered version by:
    determining possible recovered values for the pixel using ratio of color channel hue values of the target hues, and
    wherein the hue information is adjusted based on the determined possible recovered values for the pixel.

9. The apparatus of claim 8, wherein the hue recovery circuit generates the recovered version by:
    blending the possible recovered values with a hue value of the pixel of the received first image to generate a blended hue value, the blending based on how close the hue value of the pixel is relative to a maximum hue value of an image sensor capturing the first image, and
    wherein the hue information is adjusted based on the blended hue value.

10. The apparatus of claim 9, wherein the hue recovery circuit generates the recovered version by:
    performing soft clipping on the blended hue value to generate a soft clipped hue value, and
    wherein the hue information is adjusted based on the soft clipped hue value.

11. The apparatus of claim 10, wherein the hue recovery circuit generates the recovered version by:
    performing hue preservation on soft clipped hue value by recovering a hue value altered during the soft clipping to generate a hue preserved pixel value, and
    wherein the hue information is adjusted based on the hue preserved pixel value.

12. A method, comprising:
    receiving a first image capturing a scene at a first resolution comprising a pixel with hue information having a clipped color channel;
    receiving a plurality of candidate hue maps at a second resolution lower than the first resolution, each of the hue maps representing a different color channel of a second image capturing the scene at the second resolution;
    generating a target hue by processing the plurality of candidate hue maps, the target hue including information for recovering the clipped color channel of the pixel; and
    generating a recovered version of the first image by adjusting the hue information of the pixel based on the generated target hue.

13. The method of claim 12, wherein the second image is captured at an exposure level lower than an exposure level of the first image.

14. The method of claim 12, wherein hue values corresponding to color channels of pixels of the second image are not clipped.

15. The method of claim 12, wherein generating the target hue further comprises:
    upsampling the plurality of candidate hue maps into a plurality of upsampled candidate hue maps at the first resolution, and
    wherein the target hue is generated based on the upsampled candidate hue maps.

16. The method of claim 15, wherein generating the target value further comprises:
    determining a weight for each upsampled candidate hue map based on how close the candidate hue value is relative to the clipped channel hue of the pixel, and
    wherein the target hue is generated by aggregating weighted candidate hue values.

17. The method of claim 12, wherein generating the recovered version further comprises:

determining possible recovered values for the pixel using a ratio of color channel hue values of the target hues, and wherein the hue information is adjusted based on the determined possible recovered values for the pixel.

18. A non-transitory computer-readable medium storing a digital representation of an apparatus, the apparatus comprising:

a hue target circuit configured to:
receive a first image capturing a scene at a first resolution comprising a pixel with hue information having a clipped color channel;
receive a plurality of candidate hue maps at a second resolution lower than the first resolution, each of the hue maps representing a different color channel of a second image capturing the scene at the second resolution; and
generate a target hue by processing the plurality of candidate hue maps, the target hue including information for recovering the clipped color channel of the pixel; and a hue recovery circuit configured to generate a recovered version of the first image by adjusting the hue information of the pixel based on the generated target hue.

19. The apparatus of claim 1, wherein the first image is a demosaiced version of an image captured by a sensor.

20. The method of claim 12, wherein the first image is a demosaiced version of an image captured by a sensor.

* * * * *